(12) United States Patent
Fukuda et al.

(10) Patent No.: US 8,130,838 B2
(45) Date of Patent: Mar. 6, 2012

(54) ENCODING DEVICE AND DYNAMIC IMAGE RECORDING SYSTEM USING THE ENCODING DEVICE

(75) Inventors: Hideki Fukuda, Nara (JP); Hiroki Inagaki, Osaka (JP); Kazuhiko Kouno, Osaka (JP); Makoto Kawaharada, Aichi (JP)

(73) Assignee: Panasonic Corporation, Osaka (JP)

( * ) Notice: Subject to any disclaimer, the term of this patent is extended or adjusted under 35 U.S.C. 154(b) by 1202 days.

(21) Appl. No.: 11/909,166

(22) PCT Filed: Mar. 22, 2006

(86) PCT No.: PCT/JP2006/305707
§ 371 (c)(1),
(2), (4) Date: Sep. 20, 2007

(87) PCT Pub. No.: WO2006/101126
PCT Pub. Date: Sep. 28, 2006

(65) Prior Publication Data
US 2009/0052526 A1    Feb. 26, 2009

(30) Foreign Application Priority Data

Mar. 22, 2005    (JP) ................................. 2005-080970

(51) Int. Cl.
*H04N 7/12*    (2006.01)

(52) U.S. Cl. ............................ 375/240.16; 375/240.24
(58) Field of Classification Search ............. 375/240.16, 375/240.03, 240.12, 240.24, E7.104; 348/402, 348/412, 416
See application file for complete search history.

(56) References Cited

U.S. PATENT DOCUMENTS
5,721,588 A    2/1998    Fujiwara et al.
(Continued)

FOREIGN PATENT DOCUMENTS
EP    1 513 350 A1    3/2005
(Continued)

OTHER PUBLICATIONS

Supplementary European Search Report for corresponding European Application No. EP 06 72 9674 dated Apr. 1, 2011.

(Continued)

*Primary Examiner* — Ricky Ngo
*Assistant Examiner* — Phuongchau B Nguyen
(74) *Attorney, Agent, or Firm* — Renner, Otto, Boisselle & Sklar, LLP

(57) ABSTRACT

To encode a moving picture in real time in as high quality as possible, no matter whether a target bit rate for encoding the moving picture is high or low.
An encoder performs motion compensated inter-picture predictive coding on moving picture data in a selected one of prediction modes. The encoder includes: a detecting section for detecting an accumulated error and a motion vector of a block, included in a picture to be encoded, by reference to a block in a reference picture to be used for each prediction mode; an estimating section for calculating an estimated value by adding a product of each accumulated error and a predetermined first coefficient and that of a predicted vector associated with each motion vector and a second coefficient; a determining section for selecting one of the prediction modes according to the estimated value; a coefficient updating section for updating a proportionality factor using at least a quantization scale used when the block to be encoded is quantized; and an encoding section for encoding the data of the block to be encoded in the prediction mode selected.

1 Claim, 10 Drawing Sheets

U.S. PATENT DOCUMENTS

| | | | |
|---|---|---|---|
| 5,731,836 A * | 3/1998 | Lee | 375/240.16 |
| 5,825,930 A | 10/1998 | Park et al. | |
| 5,963,673 A | 10/1999 | Kodama et al. | |
| 6,091,460 A | 7/2000 | Hatano et al. | |
| 2006/0088103 A1* | 4/2006 | Kanehara | 375/240.16 |
| 2009/0052526 A1* | 2/2009 | Fukuda et al. | 375/240.03 |
| 2011/0123126 A1* | 5/2011 | Odagiri | 382/233 |

FOREIGN PATENT DOCUMENTS

| | | |
|---|---|---|
| JP | 07-274181 | 10/1995 |
| JP | 08-046971 | 2/1996 |
| JP | 09-322176 | 12/1997 |
| JP | 10-075453 | 3/1998 |
| JP | 10-145792 | 5/1998 |
| JP | 10-327420 | 12/1998 |
| JP | 2000-013802 | 1/2000 |
| JP | 2000-032468 | 1/2000 |
| JP | 2002-232892 | 8/2002 |

OTHER PUBLICATIONS

Bormans et al., "Video coding with H.264/AVC: Tools, Performance and Complexity", IEEE Circuits and Systems Magainze, IEEE Service Center, New York, NY US, vol. 4., No. 1, Jan. 1, 2004, pp. 7-28, XP011111220, ISSN: 1531-636X.

Kuo e al., "Fast inter-prediction mode decision and motion search for H.264", 2004 IEEE International Conference on Multimedia and Expo (ICME), Jun. 27-30, 2004, Taipei, Taiwan, Piscataway, NJ: IEEE Operations Center, US, vol. 1, Jun. 27, 2004, pp. 663-666, XP010770898, ISBN: 978-0-7803-8603-7.

Wiegand et al., "Rate-constrained coder control and comparison of video coding standards", IEEE Transactions on Circuits and Systems for Video Technology, IEEE Service Center Piscataway, NJ US, vol. 13, No. 7, Jul. 1, 2003, pp. 688-703, XP011099260, ISSN: 1051-8215.

International Search Report for corresponding Application No. PCT/JP2006/305707 mailed Jun. 27, 2006.

* cited by examiner (a) FRAME-BY-FRAME CODING (b) FIELD-BY-FIELD CODING

FIG.6

| quantiser_scale_code | quantiser_scale[qscale_type] | |
| --- | --- | --- |
| | qscale_type = 0 | qscale_type = 1 |
| 1 | 2 | 1 |
| 2 | 4 | 2 |
| 3 | 6 | 3 |
| 4 | 8 | 4 |
| 5 | 10 | 5 |
| 6 | 12 | 6 |
| 7 | 14 | 7 |
| 8 | 16 | 8 |
| 9 | 18 | 10 |
| 10 | 20 | 12 |
| 11 | 22 | 14 |
| 12 | 24 | 16 |
| 13 | 26 | 18 |
| 14 | 28 | 20 |
| 15 | 30 | 22 |
| 16 | 32 | 24 |
| 17 | 34 | 28 |
| 18 | 36 | 32 |
| 19 | 38 | 36 |
| 20 | 40 | 40 |
| 21 | 42 | 44 |
| 22 | 44 | 48 |
| 23 | 46 | 52 |
| 24 | 48 | 56 |
| 25 | 50 | 64 |
| 26 | 52 | 72 |
| 27 | 54 | 80 |
| 28 | 56 | 88 |
| 29 | 58 | 96 |
| 30 | 60 | 104 |
| 31 | 62 | 112 |

| 8 | 16 | 19 | 22 | 26 | 27 | 29 | 34 |
|---|---|---|---|---|---|---|---|
| 16 | 16 | 22 | 24 | 27 | 29 | 34 | 37 |
| 19 | 22 | 26 | 27 | 29 | 34 | 34 | 38 |
| 22 | 22 | 26 | 27 | 29 | 34 | 37 | 40 |
| 22 | 26 | 27 | 29 | 32 | 35 | 40 | 48 |
| 26 | 27 | 29 | 32 | 35 | 40 | 48 | 58 |
| 26 | 27 | 29 | 34 | 38 | 46 | 56 | 69 |
| 27 | 29 | 35 | 38 | 46 | 56 | 69 | 83 |

(a) FOR Intra CODING

| 16 | 16 | 16 | 16 | 16 | 16 | 16 | 16 |
|---|---|---|---|---|---|---|---|
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |
| 16 | 16 | 16 | 16 | 16 | 16 | 16 | 16 |

(b) FOR Non-Intra CODING

MPEG-2 DEFAULT MATRIX $$K1 = G(Qcur) = \left( \frac{B\_ave}{AE\_ave} \cdot Q\_ave \right) \frac{1}{Qcur}$$

ENCODING DEVICE AND DYNAMIC IMAGE RECORDING SYSTEM USING THE ENCODING DEVICE

TECHNICAL FIELD

The present invention relates to a technique for encoding moving picture data highly efficiently.

BACKGROUND ART

Recently, as multimedia applications have been further broadened, it has become more and more commonplace to convert information on every type of medium, including image, audio and text data, for example, into digital data and process it collectively. Among other things, the size of the digital image data (e.g., digital moving picture data, in particular) is so huge that an encoding technique for encoding the moving picture data highly efficiently is required to store and transmit that data. As exemplary encoding techniques that were developed for the purpose of encoding a moving picture, encoding schemes as like MPEG-1, 2 and 4 defined by International Organization for Standardization (ISO), are known.

According to each of these encoding schemes, the input picture data is divided into a number of blocks, and each of those blocks can be encoded selectively by either intra coding (i.e., an encoding mode with no motion compensation) or inter-picture predictive coding (i.e., an encoding mode with motion compensation). Of these two techniques, the motion compensated prediction of the inter-picture predictive coding has a plurality of prediction modes associated with various types of motion vectors for use in the motion compensation. In encoding, an appropriate one of the prediction modes is selected to encode each block.

The prediction modes are roughly classified into the three types of forward predictive coding, backward predictive coding and bidirectional predictive coding according to the prediction direction. And each of these three coding modes is further classifiable into frame predictive coding to be performed on the entire frame of the block to be encoded, field predictive coding to be performed on a first type of (e.g., odd-numbered) fields, and field predictive coding to be performed on a second type of (e.g., even-numbered) fields. That is to say, there can be six prediction modes in all.

FIG. 1 shows a configuration for a conventional moving picture encoder 100, which includes an input picture memory 101, a subtracting section 102, an orthogonal transformation section 103, a quantization section 104, a variable-length encoding section 105, an inverse quantization section 106, an inverse orthogonal transformation section 107, an adding section 108, a reference picture memory 109, a motion detection section 110, a prediction mode determining section 111 and a motion compensation section 112.

The prediction mode for use in the motion compensated prediction of the inter-picture predictive coding is determined mainly by the motion detection section 110 and the prediction mode determining section 111.

The motion detection section 110 detects a similar block region from a specified range of the reference picture data, which is stored in the reference picture memory 109, with respect to the block-by-block input picture data that has been supplied from the input picture memory 101 and outputs a motion vector representing the magnitude of motion and the accumulated error representing the degree of similarity between the blocks. If the six types of prediction modes are all available, motion detection is carried out on the reference picture data that is specified for each of those prediction modes.

The prediction mode determining section ill determines the prediction mode for use in the motion compensation section 112 by the accumulated error associated with the motion vector of the prediction mode that has been detected by the motion detection section 110.

Hereinafter, a conventional method of determining the prediction mode will be described. To detect a block similar to the block to be encoded for a certain prediction mode, the motion detection section 110 calculates the total sum of the absolute values of differences between the block to be encoded and the reference picture block at respective pixel locations as an accumulated error and uses it as an estimated value. Then, the motion detection section 110 uses the magnitude of motion to the location where the accumulated error becomes minimum as the motion vector of that prediction mode and outputs the motion vector along with the accumulated error.

For example, the accumulated error AE (i, j) of one-direction frame prediction, which is one of the prediction modes according to the MPEG standards and a generic term covering forward prediction and backward prediction, may be calculated by the following Equation (1):

$$AE(i,j) = \Sigma |Y(x, y) - \text{Ref}Y(i+x, j+y)| \quad (1)$$

Y (x, y) represents the pixel value at a location (x, y) in the block to be encoded in the input picture data, RefY (i+x, j+y) represents the pixel value at a location (i+x, j+y) within a search range of the reference picture data, and AE (i, j) represents the accumulated error in inter-block matching. The motion vector is defined as the magnitude of motion to the location (i, j) where the accumulated error AE (i, j) is minimized. FIG. 2 shows a relation between the block to be encoded Y and the block at a location (i, j) where the accumulated error AE (i, j) is minimized in reference picture data RefY. The vector directed from a reference point (0, 0) to (i, j) is the motion vector.

The prediction mode determining section 111 compares with each other the accumulated errors AE of the respective prediction modes that have been supplied from the motion detection section 110, selects one of the prediction modes in which the accumulated error AE is the minimum, and determines it as a prediction mode for use in motion compensation. This method is based on a common conception that the smaller the accumulated error, the smaller the distortion caused by encoding and the generated code size would normally be.

Various other methods for determining a prediction mode have been proposed. For example, Patent Document No. 1 discloses a method in which the bidirectional prediction mode is prohibited and only the forward or backward prediction mode is selected if the ratio of the target bit rate for encoding to the size of the input picture (i.e., the number of pixels) becomes equal to or greater than a predetermined threshold value.

The method of Patent Document No. 1 is proposed to overcome the problem that if the target bit rate is low, the code size becomes too big for the motion vector and too small for the predicted error picture data to avoid eventual deterioration in image quality. As the code size in the bidirectional prediction mode should be greater than that in the forward or backward prediction mode, the bidirectional prediction mode is prohibited according to this method if the ratio described above becomes equal to or greater than a predetermined threshold value.

Examples of main pieces of block-by-block information contained in an MPEG encoded bit stream include a piece of information indicating whether intra coding or inter-picture predictive coding should be carried out, the prediction mode and motion vector for the inter-picture predictive coding, encoded picture data (i.e., input picture data in cases of intra coding and encoded data for predicted error picture data in cases of inter-picture predictive coding) and quantization scale. Among these pieces of information, the encoded picture data generated by quantization can have its code size controlled dynamically by changing the settings of the quantization scale.

As this method is irreversible compression involving quantization, however, it is important how to reduce the encoding noise while cutting down the generated code size. Generally speaking, if encoding is performed at a sufficiently high target bit rate for the picture size of input picture data, the percentage of the motion vector to the overall encoded data is low. That is why the generation of encoding noise can be minimized with only the quantization distortion and the generated code size considered for the predicted error picture data.

Patent Document No. 2 discloses another exemplary method for determining the prediction mode. Specifically, according to the method of Patent Document No. 2, a table of code sizes for respective elements of predicted error picture data and motion vectors is drawn up in advance, the code size, as well as the predicted error picture data and the motion vector, is calculated in every prediction mode, and a prediction mode that would have an appropriate code size is selected. According to this method, the prediction mode can be selected not just when the target bit rate is particularly low.

Patent Document No. 1: Japanese Patent Application Laid-Open Publication No. 2000-13802

Patent Document No. 2: Japanese Patent Application Laid-Open Publication No. 9-322176

DISCLOSURE OF INVENTION

Problems to be Solved by the Invention

As far as the inter-picture predictive coding process is concerned, however, it is difficult to use the conventional method for determining the prediction mode in an application that requires real-time encoding. This is because in real-time encoding, no matter whether the target bit rate is high or low, the generated code size needs to be controlled appropriately according to that bit rate. Nevertheless, various types of picture data, including still pictures, moving pictures, high-definition pictures, and pictures with low SNRs, are actually input and those input picture data change incessantly. That is why to maintain good image quality constantly, it is important to change the prediction modes appropriately depending on the situation.

For example, according to the prediction mode determining method of Patent Document No. 1, if the encoding process is carried out at a relatively low bit rate for the picture size of the input picture data, available prediction modes are always limited. As a result, the best prediction mode cannot be selected for a type of input picture data that has such a high degree of correlation between pictures as to require high-precision motion compensation.

Furthermore, in cases of real-time processing, a table of code sizes for respective elements and motion vectors of predicted error picture data as disclosed in Patent Document No. 2 cannot be stored in advance.

An object of the present invention is to encode a moving picture in real time with as high quality as possible, no matter whether the target bit rate for encoding the moving picture is high or low.

Means for Solving the Problems

An encoder according to the present invention performs motion compensated inter-picture predictive coding on moving picture data, which is presented by switching multiple pictures one after another, in a selected one of multiple prediction modes. The encoder includes: a detecting section for detecting an accumulated error and a motion vector of a block, included in a picture to be encoded, by reference to a block in a reference picture to be used for each of the multiple prediction modes; an estimating section for calculating an estimated value by adding together a product of each accumulated error and a predetermined first coefficient and a product of a predicted vector associated with each said motion vector and a second coefficient; a determining section for selecting one of the multiple prediction modes according to the estimated value; a coefficient updating section for updating a proportionality factor using at least a quantization scale that is used when the block to be encoded is quantized; and an encoding section for encoding the data of the block to be encoded in the prediction mode selected.

The encoder may further include a transformation section for transforming data, representing the accumulated error of the block to be encoded, into a coefficient including a plurality of frequency components, and a quantization section for quantizing the coefficient including those frequency components based on a predetermined quantization matrix and the quantization scale to generate a quantized value. The encoding section may encode each said quantized value according to the prediction mode selected.

The quantization section may quantize the coefficient including those frequency components block by block based on a product of the quantization matrix and the predetermined quantization scale to generate a quantized value.

The coefficient updating section may update the first coefficient based on the accumulated error in the prediction mode, the size of the encoded data, the quantization scale for a block that was encoded in the past and on the quantization scale for the block to be encoded.

The coefficient updating section may figure out the second coefficient based on the number of pixels showing the range of the block that is defined for the reference picture.

The estimating section may calculate the estimated value on the supposition that a product of the accumulated error of each said prediction mode and the predetermined first coefficient is zero if the accumulated error of each said prediction mode is smaller than the average of accumulated errors when all quantized transform coefficients become equal to zero for the block that was encoded in the past.

Alternatively, the estimating section may also calculate the estimated value by adding a correction coefficient to a product of each said accumulated error and the predetermined first coefficient and then adding a greater one of the sum and a predetermined threshold value to a product of a predicted vector associated with the motion vector and the second coefficient.

The coefficient updating section may update the first coefficient based on the average of accumulated errors when all quantized transform coefficients associated with the accumulated error in the prediction mode become equal to zero and on the average of accumulated errors when some of the quantized transform coefficients associated with the accumulated error become not equal to zero. And the coefficient updating section may update the correction coefficient based on the first coefficient and the average of accumulated errors when all of the quantized transform coefficients associated with the accumulated error become equal to zero.

A moving picture recording system according to the present invention includes: a video signal receiving section for receiving a video signal representing a moving picture, which is presented by switching multiple pictures one after another, and outputting moving picture data; an encoder for performing motion compensated inter-picture predictive coding on the moving picture data in a selected one of multiple prediction modes, thereby outputting encoded data; and a storage section for writing the encoded data on a storage medium. The encoder includes: a detecting section for detecting an accumulated error and a motion vector of a block, included in a picture to be encoded, by reference to a block in a reference picture to be used for each of the multiple prediction modes; an estimating section for calculating an estimated value by adding together a product of each accumulated error and a predetermined first coefficient and a product of a predicted vector associated with each said motion vector and a second coefficient; a determining section for selecting one of the multiple prediction modes according to the estimated value; and a coefficient updating section for updating a proportionality factor using at least a quantization scale that is used when the block to be encoded is quantized.

EFFECTS OF THE INVENTION

According to the present invention, in performing motion compensated prediction for inter-picture predictive coding, coefficients for use in a method of calculating an estimated value to determine the prediction mode are learned and updated during the encoding process. The coefficients are updated based on the accumulated error of the prediction mode and the actually generated code size of a picture (more specifically, a picture block) that was encoded in the past and on the quantization scales determined by the quantization section (including both what was used in the past and what is used for the current block to be encoded). And the estimated value is calculated by using not only the accumulated error multiplied by the coefficient but also a variation about the motion vector. As a result, compared to a situation where only the accumulated error is used, an accumulated error that is closer to the actually generated code size can be estimated. Consequently, an appropriate prediction mode can always be selected and good image quality is realized constantly.

Figure 4:
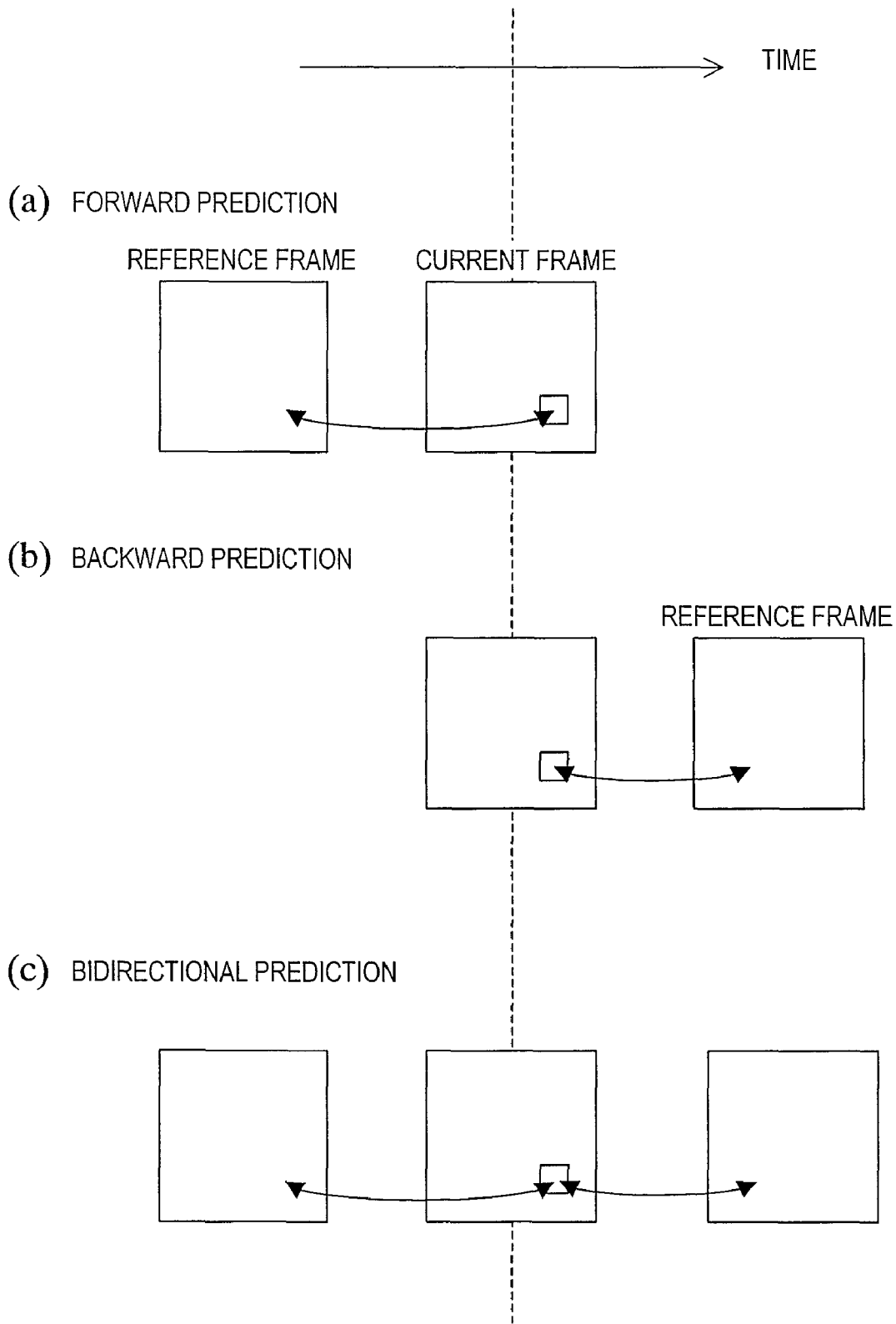

Portions (a) through (c) of FIG. 4 show the concepts of three types of prediction methods.

Figure 5:
Figure 5:
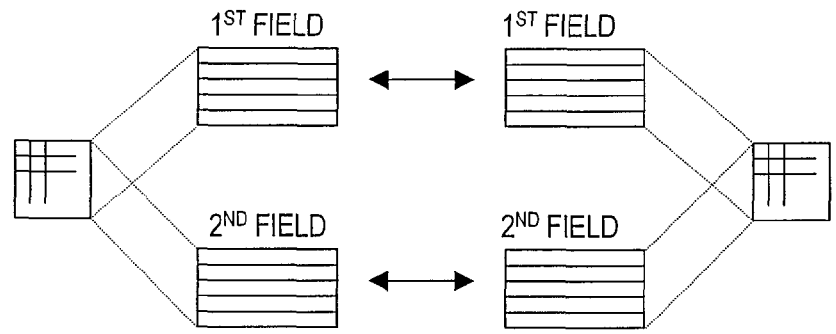

Portions (a) and (b) of FIG. 5 show relations between a block to be encoded and its associated block in a reference frame in a situation where non-intra coding is carried out.

FIG. 6 is a table showing the allocation of quantization scales.

Figures 7, 8:
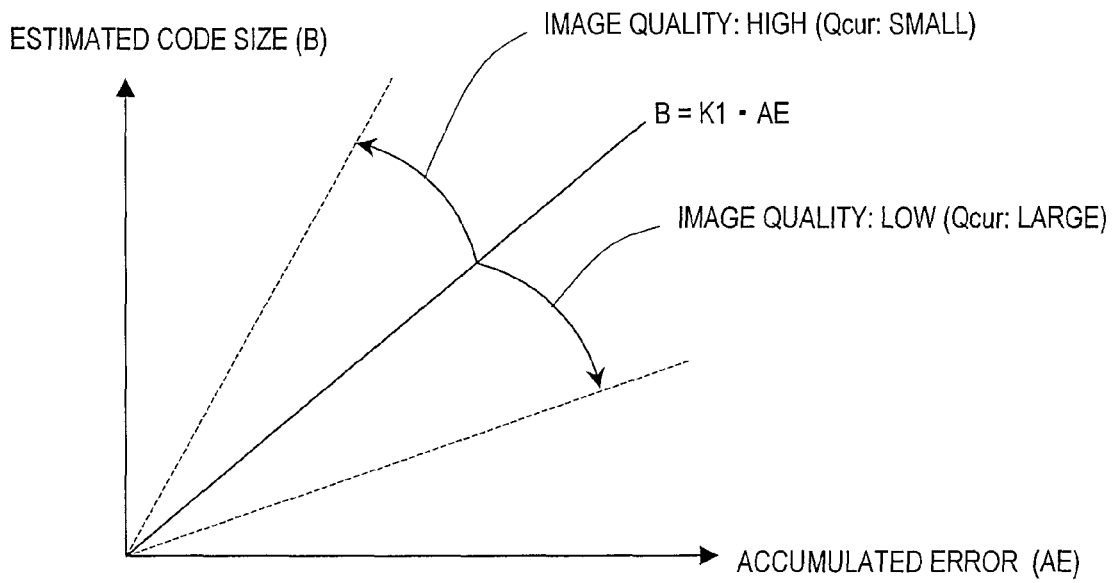

FIG. 7 shows a group of default matrices compliant with the MPEG-2 standard.

FIG. 8 is a graph showing a correlation between the proportionality factor K1, the accumulated error AE and the estimated code size B.

Figure 9:
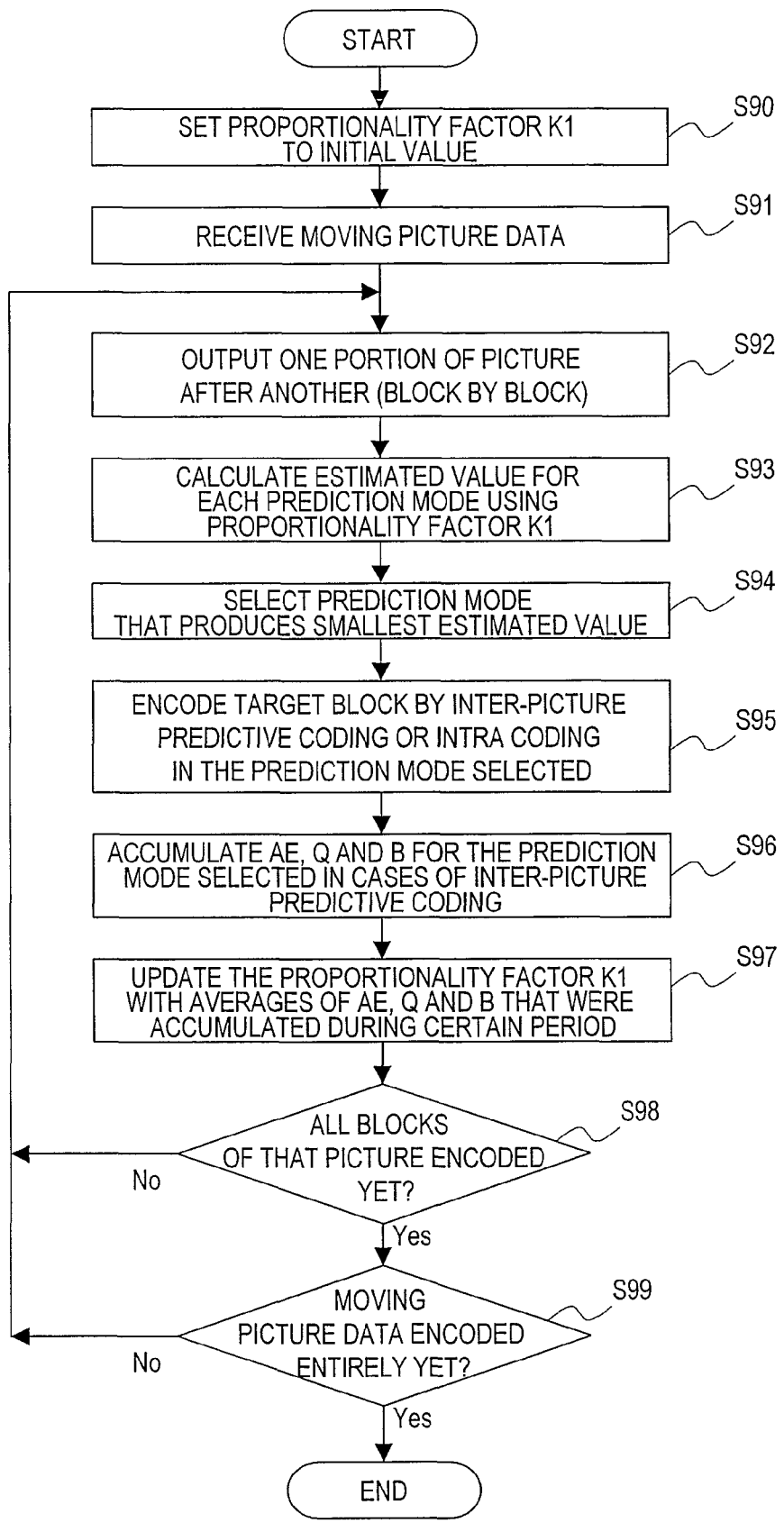

FIG. 9 is a flowchart showing the procedure of the encoding process to be carried out by the encoder 210.

Figure 10:
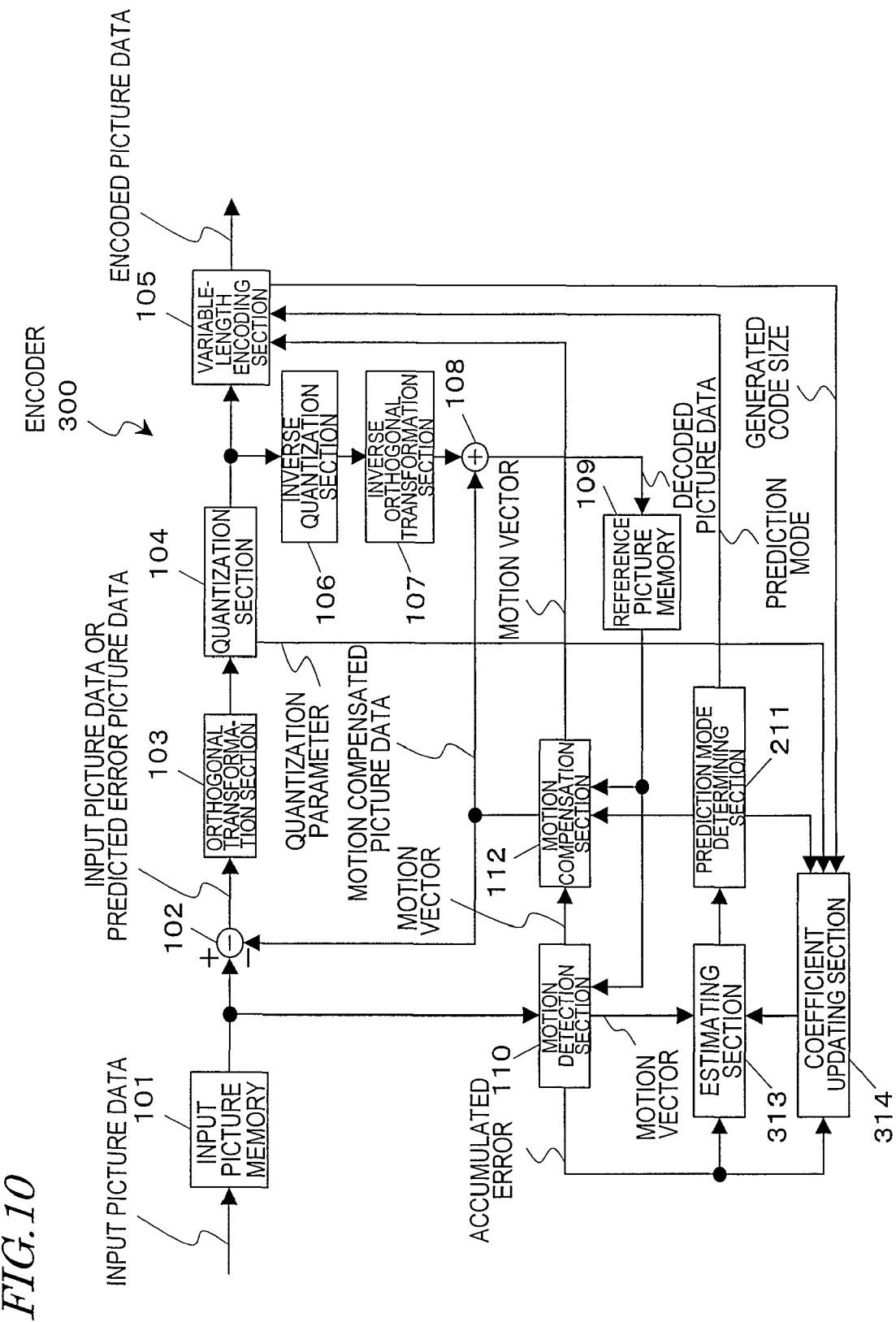

FIG. 10 shows a configuration for an encoder 300 according to a preferred embodiment of the present invention.

Figure 11:
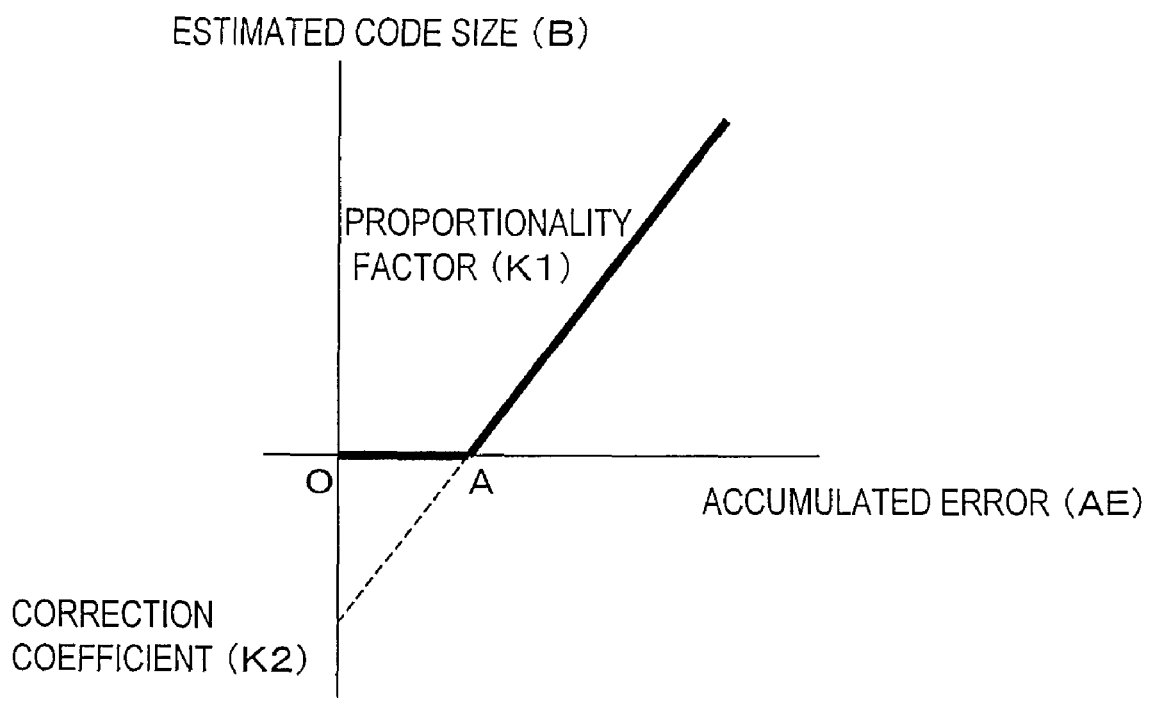

FIG. 11 is a graph showing how the estimated code size for the predicted error data (the first term of the right side of Equation (6)) changes.

DESCRIPTION OF REFERENCE NUMERALS 100 conventional moving picture encoder
101 input picture memory
102 subtracting section
103 orthogonal transformation section
104 quantization section
105 variable-length encoding section
106 inverse quantization section
107 inverse orthogonal transformation section
108 adding section
109 reference picture memory
110 motion detection section
111, 211 prediction mode determining section
112 motion compensation section
200 recorder
205 video signal receiving section
210 moving picture encoder according to Embodiment 1
213, 313 estimating section
214, 314 coefficient updating section
215-1, 215-2 storage section
300 moving picture encoder according to Embodiment 2

BEST MODE FOR CARRYING OUT THE INVENTION

Hereinafter, preferred embodiments of a data processor according to the present invention will be described with reference to the accompanying drawings. In the following description, the data processor is supposed to be a recorder for recording a moving picture and/or an encoder for encoding a moving picture inside a recorder.

Embodiment 1

Figure 1:
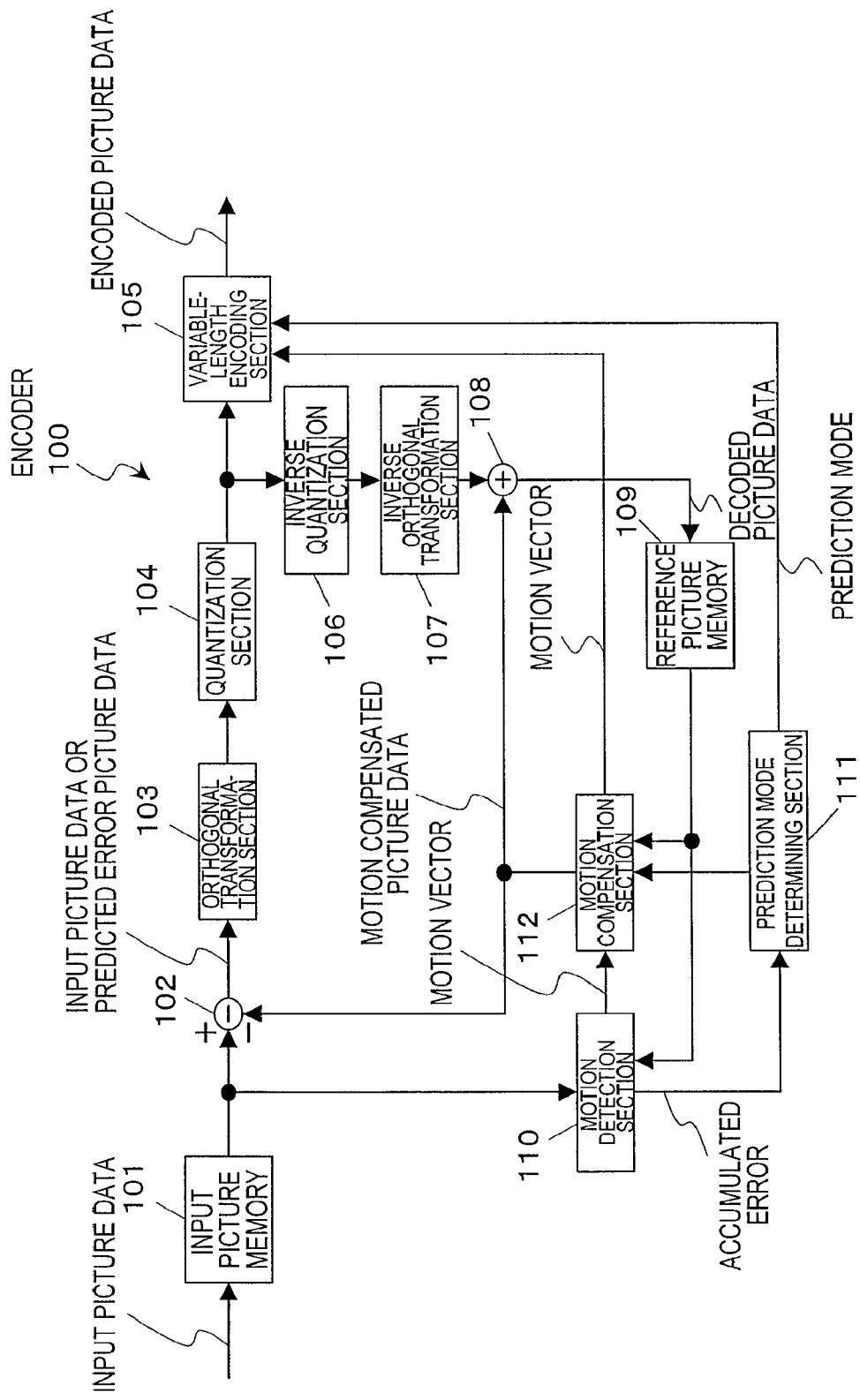
FIG. 1 shows a configuration for a conventional moving picture encoder 100.
Figure 2:
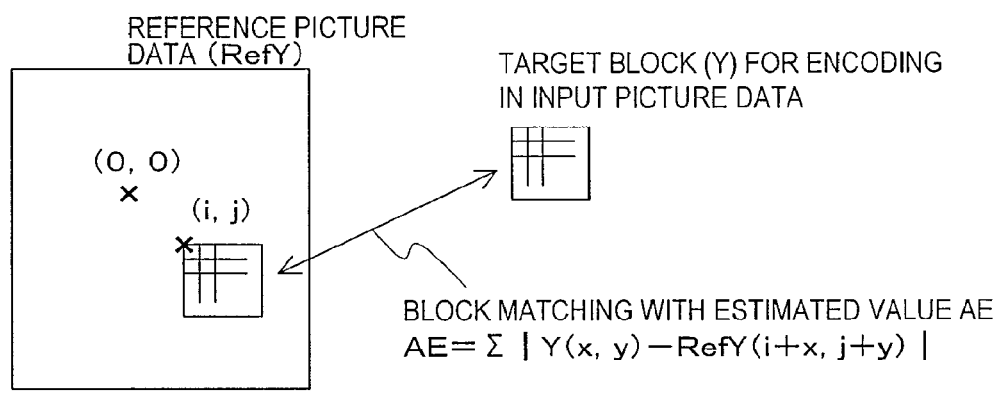
FIG. 2 shows a relation between a block to be encoded Y and a block at a location (i, j) where the accumulated error AE (i, j) is minimized in reference picture data RefY.
Figure 3:
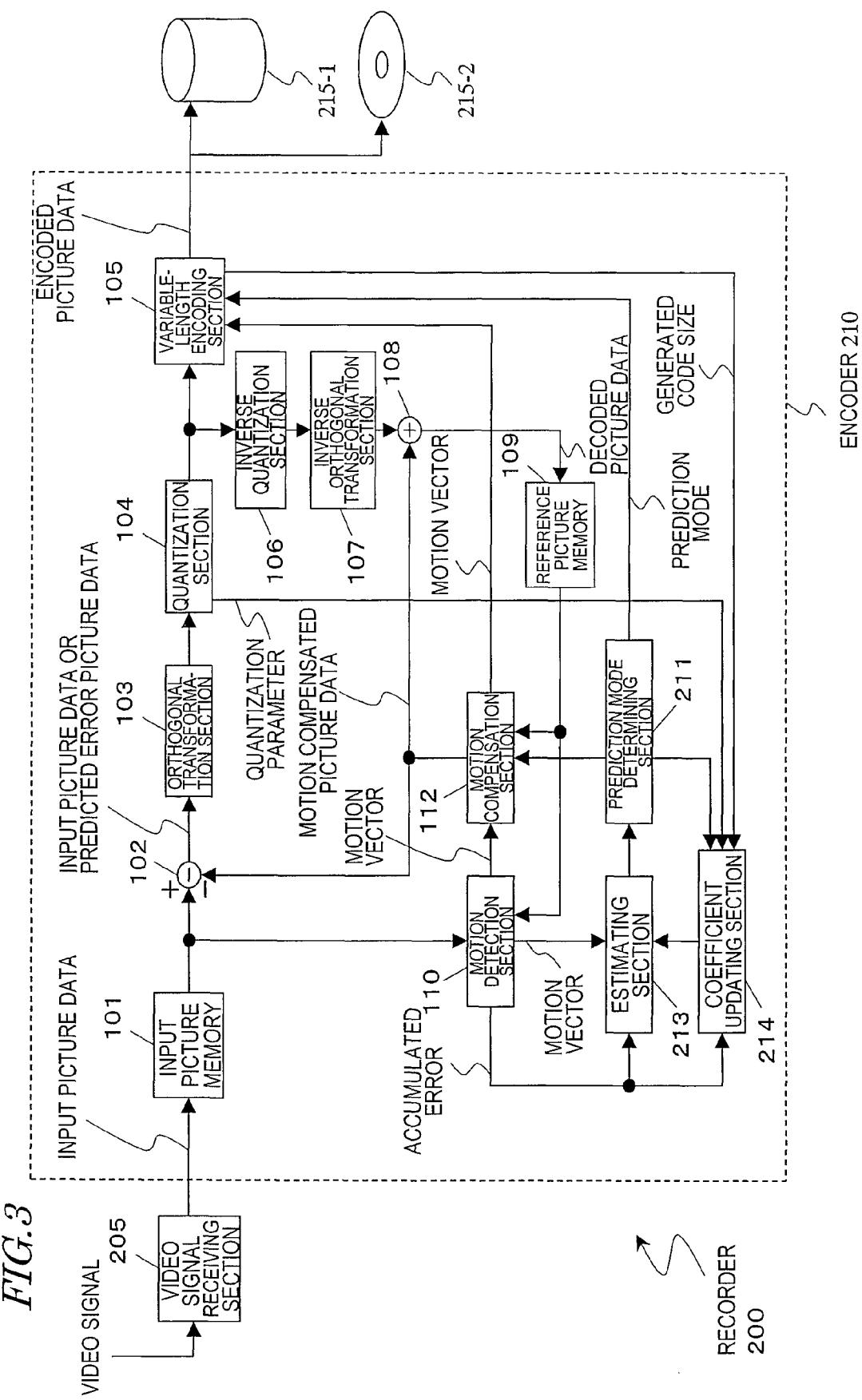
FIG. 3 shows a configuration for a recorder 200 according to a first preferred embodiment of the present invention.

FIG. 3 shows a configuration for a recorder 200 according to a first preferred embodiment of the present invention. The recorder 200 may be implemented as either a TV program recorder for receiving and writing a TV signal on a hard disk or an optical disk in real time or a camcorder that allows the user to record video of an object on a hard disk or an optical disk in real time with or without audio.

The recorder 200 includes a video signal receiving section 205, an encoder 210 and storage sections 215-1 and 215-2. The video signal receiving section 205 may be either a tuner that receives an analog TV signal, converts the signal into a digital signal (digital data) and then outputs the data or a CCD for outputting the video of an object as digital data.

The encoder 210 encodes the digital data representing the moving picture, thereby generating encoded picture data. The moving picture is presented by switching a plurality of pictures one after another and the encoding process is carried out on a picture basis, more specifically, on the basis of a block, which is a constituting unit of the picture. The encoder 210 may be implemented as an encoder board by integrating together its circuit components on a single substrate.

In the following description, a set of 16×16 pixels that form a single picture is called a "macroblock", while a block consisting of a smaller number of pixels (e.g., a set of 8×8 pixels) is called a "sub-macroblock". This naming is almost as defined by the MPEG standards. However, since the unit changes according to the type of the encoding process, the "macroblock" and "sub-macroblock" will be referred to herein as "blocks" collectively.

For example, the storage sections 215-1 and 215-2 may be a hard disk drive and an optical disk drive, respectively. The hard disk drive and the optical disk drive can read and write the encoded picture data (video data stream) from/on a hard disk and an optical disk. It should be noted that the storage section 215-2 is illustrated as an optical disk for the sake of simplicity.

The encoder 210 may also be implemented within a single housing. In that case, the recorder 200 may be regarded as a recording system including the video signal receiving section 205 as a tuner, the encoder 210 and the storage devices 215-1 and 215-2.

Hereinafter, the encoder 210 will be described in detail. The encoder 210 includes an input picture memory 101, a subtracting section 102, an orthogonal transformation section 103, a quantization section 104, a variable-length encoding section 105, an inverse quantization section 106, an inverse orthogonal transformation section 107, an adding section 108, a reference picture memory 109, a motion detection section 110, a prediction mode determining section 211, a motion compensation section 112, an estimating section 213 and a coefficient updating section 214.

The encoder 210 encodes the picture data of the moving picture by either intra coding or inter-picture (or non-intra) predictive coding.

According to each of these coding methods, picture data can be encoded on a block-by-block basis. In intra coding, the encoding process is carried out on only the data of the block to be encoded and no prediction is made on the time axis. The intra-coded block (and picture) can also be decoded based on only its own picture data.

In non-intra coding on the other hand, the data of the block to be encoded is encoded by reference to the picture data of other pictures. This coding method uses the picture data of a picture that precedes the current picture on the time axis and/or that of another picture that succeeds the current picture on the time axis and does make prediction on the time axis. As a result, the data can be compressed at a higher rate.

Portions (a) through (c) of FIG. 4 show the concepts of the three types of prediction methods. Specifically, portion (a) of FIG. 4 shows the concept of the forward prediction. According to this method, a block in the current frame to be encoded is encoded using the data of another frame that has been presented earlier than the current one (i.e., in the past). Portion (b) of FIG. 4 shows the concept of the backward prediction. According to this method, a block in the current frame to be encoded is encoded using the data of another frame that will be presented later than the current one (i.e., in the future). And portion (c) of FIG. 4 shows the concept of the bidirectional prediction. According to this method, a block in the current frame to be encoded is encoded using both the data of another frame that has been presented earlier than the current one and that of still another frame that will be presented later than the current one. Such a frame to be used when the data of the current frame is encoded is called a "reference frame".

No matter whether intra coding or non-intra coding is adopted, the modes of encoding the target block may be switched between a mode in which the entire block is encoded at a time and a mode in which that block is divided into a first type of (e.g., odd-numbered) fields and a second type of (e.g., even-numbered) fields and then the data in these two types are encoded separately. To distinguish these two modes, the former mode will be referred to herein as "frame-by-frame encoding" and the latter mode as "field-by-field encoding" for convenience sake. It should be noted that neither the "frame" nor the "field" means a single picture in this case.

Portions (a) and (b) of FIG. 5 show relations between a block to be encoded and its associated block in a reference frame in a situation where non-intra coding is carried out. Specifically, portion (a) of FIG. 5 shows an example of frame-by-frame encoding. In that case, the block to be encoded shown on the left-hand side is encoded by reference to the entire block in the reference frame shown on the right-hand side. On the other hand, portion (b) of FIG. 5 shows an example of field-by-field encoding. In that case, a first field of the block to be encoded shown on the left-hand side is encoded by reference to first and second fields of a block in the reference frame. A second field of the block to be encoded shown on the left-hand side is encoded by reference to first and second fields of a block in the reference frame.

As can be seen easily from the foregoing description, the non-intra coding process may adopt one of the following six predictive encoding methods that are called "prediction modes":

(1) forward predictive frame-by-frame encoding,
(2) forward predictive field-by-field encoding,
(3) backward predictive frame-by-frame encoding,
(4) backward predictive field-by-field encoding,
(5) bidirectional predictive frame-by-frame encoding, and
(6) bidirectional predictive field-by-field encoding.

Next, the respective components of the encoder 210 will be described one by one with reference to FIG. 3 again.

The input picture memory 101 is a memory for storing the picture data of each input picture until the data is encoded. Even when the output of the picture data is delayed due to a change of the encoding orders, the input picture memory 101 still has sufficient storage capacity. During the encoding process, the picture data of each input picture is divided into a plurality of blocks and encoded on a block-by-block basis. And the input picture memory 101 can output the picture data on a block-by-block basis.

The subtracting section 102 receives the input picture data, which has been supplied from the input picture memory 101 on a block-by-block basis, at its non-inverting input terminal. If intra coding is going to be carried out with no motion compensation or prediction, the subtracting section 102 outputs, as it is, the input picture data that has been received at its non-inverting input terminal. On the other hand, if non-intra coding is going to be carried out with motion compensation and prediction, the subtracting section 102 receives the block-by-block motion compensated picture data from the motion compensation section 112 at its inverting input terminal, carries out subtraction on the data, and outputs block-by-block predicted error picture data as a result of the subtraction.

The orthogonal transformation section 103 performs orthogonal transformation on the block-by-block picture data that has been supplied from the subtracting section 102, thereby transforming the data into frequency components. As the orthogonal transformation, a discrete cosine transform is known, for example.

According to the quantization characteristic determined by the quantization scale and the quantization matrix, the quantization section 104 quantizes the orthogonal transform coefficient supplied from the orthogonal transformation section 103 and outputs the result as a quantized transform coefficient.

Hereinafter, the quantization scale and the quantization matrix will be described more specifically.

The MPEG-2 standard defines two types of quantization scales. FIG. 6 shows a quantization scale allocation table. Type 0 (qscale_type=0) and Type 1 (qscale_type=1) are defined for each of the quantization scale codes (quantiser_scale_code) #1 through #31 shown on the left column, and one of the two values is allocated as a quantization scale.

The quantization section 104 determines the value of the quantization scale according to the target bit rate and the generated code size of the encoded picture data. For example, if the real bit rate corresponding to the formerly generated code size is higher than the target bit rate, the real bit rate is decreased by increasing the quantization scale so as to be closer to the target bit rate. On the other hand, if the real bit rate is lower than the target bit rate, the real bit rate is increased by decreasing the quantization scale so as to be closer to the target bit rate.

The type of the quantization scale is normally fixed as either Type 0 or Type 1 but does not have to be fixed. The quantization scale thus determined is associated with the quantization scale code (quantiser_scale_code) by reference to the table shown in FIG. 6. This quantization scale code will be encoded by the variable-length encoding section 105 as will be described later.

The target bit rate may be either directly specified by the user before the video starts to be recorded or automatically set by making the user select a video recording mode associated with the target bit rate. The target bit rate is an encoding condition for encoding.

Next, the quantization matrices will be described. The MPEG-2 standard defines standard quantization matrices that are used unless otherwise specified (which will be referred to herein as "default matrices"). FIG. 7 shows a group of default matrices compliant with the MPEG-2 standard. The matrices shown in portions (a) and (b) of FIG. 7 are used for intra coding and non-intra coding, respectively.

The quantization section 104 multiplies the respective element values of the quantization matrix by the value of the quantization scale determined, thereby calculating the quantized characteristic of each frequency component. The block-by-block picture data is quantized based on this quantized characteristic.

Look at FIG. 3 again. The variable-length encoding section 105 performs variable-length encoding on the quantized transform coefficient that has been supplied from the quantization section 204 to output encoded picture data. If non-intra coding is going to be carried out, the variable-length encoding section 105 performs variable-length encoding on the quantized transform coefficient in accordance with the information about the motion vector that has been calculated by the motion compensation section 112, thereby outputting encoded picture data.

The inverse quantization section 106 performs inverse quantization on the quantized transform coefficient that has been supplied from the quantization section 104, thereby generating an orthogonal transform coefficient. During this inverse quantization, the same quantization characteristic as that used by the quantization section 104 is used again.

The inverse orthogonal transformation section 107 performs inverse orthogonal transformation on the orthogonal transform coefficient that has been supplied from the inverse quantization section 106, thereby generating decoded picture data. If the subtracting section 102 has selected intra coding, then the inverse orthogonal transformation section 107 generates a decoded picture with respect to the block-by-block input picture data. On the other hand, if the subtracting section 102 has selected non-intra coding, then the inverse orthogonal transformation section 107 generates a decoded picture with respect to the block-by-block predicted error picture data.

The adding section 108 adds together the decoded picture of the predicted error picture data and the block-by-block motion compensated picture data that has been supplied from the motion compensation section 112, thereby generating definitive decoded picture data.

The reference picture memory 109 has storage capacity that is ample enough to store and retain the reference picture data for use in encoding. If intra coding is going to be carried out, the reference picture memory 109 stores, as it is, the block-by-block decoded picture data that has been generated by the inverse orthogonal transformation section 107. On the other hand, if non-intra coding is going to be carried out, the reference picture memory 109 stores the block-by-block decoded picture data that has been generated by the adding section 108. In any case, the decoded picture data stored in the reference picture memory 109 will be used as a reference picture when motion compensated inter-picture predictive coding is carried out on pictures that are going to be input after that.

The motion detection section 110 detects a similar block region from a specified range of the reference picture data, which is stored in the reference picture memory 109, with respect to the block-by-block input picture data that has been supplied from the input picture memory 101 and outputs an accumulated error representing the degree of similarity between the blocks and a motion vector representing the magnitude of motion.

The accumulated error is calculated as AE (i, j) by Equation (1) described above, and the motion vector is defined as the magnitude of motion to the location (i, j) where the accumulated error AE (i, j) is minimized.

The processing of calculating the accumulated error and the motion vector is called "motion detection processing". If the six types of prediction modes are all available, the motion detection section 110 carries out the motion detection processing on the reference picture data that is specified for each of those prediction modes.

The motion compensation section 112 generates block-by-block motion compensated picture data by using one of the motion vectors that has been detected by the motion detection section 110 and that is associated with the prediction mode determined by the prediction mode determining section 211 (to be described below) on the reference picture that is stored in the reference picture memory 109 for inter-picture predictive coding.

The prediction mode determining section 211 (which will be simply referred to herein as "determining section") determines the prediction mode for use in the motion compensation section 112 by the estimated value that has been calculated for each prediction mode by the estimating section 213.

The estimating section 213 calculates an estimated value for each prediction mode based on the accumulated error and motion vector of the prediction mode that have been supplied from the motion detection section 110 and on the proportionality factor (to be described later) that has been determined by the coefficient updating section 214. For example, an estimation function for calculating an estimated value J for one-direction frame prediction, which is one of the prediction modes according to the MPEG standards, may be given by the following Equations (2) and (3):

$$J = K1 * AE + Kmv * \Delta MV \quad (2)$$

$$\Delta MV = |MVx - PMVx| + |MVy - PMVy| \quad (3)$$

In Equation (2), K1 is a proportionality factor to be multiplied by the accumulated error AE of the predicted error picture data and Kmv is a proportionality factor to be multiplied by the variation ΔMV of the motion vector (i.e., predicted vector).

Also, in Equation (2), the first term of the right side corresponds to the estimated value of the predicted error picture data (i.e., estimated code size) and the second term of the right side corresponds to the estimated value of the motion vector (i.e., estimated code size).

In Equation (3), MVx and MVy respectively represent the horizontal and vertical components of the motion vector, PMVx and PMVy respectively represent MVx and MVy of the motion vector of the previous encoded block and Kmv can be defined as in the following Equations (4) using the number N of pixels that are included within the target detection range for the motion detection section 110:

If $N<400$, $Kmv=0.8$ and

If $N\geq 400$, $Kmv=0.4$      (4)

As can be seen from Equations (4), Kmv in a situation where the number N of pixels included within the target detection range is equal to or greater than 400 (i.e., when the target detection range is relatively broad) is set smaller than Kmv in a situation where the number N of pixels is less than 400. This setting is adopted in view of a feature of variable-length encoding that realizes encoding efficiently even if the motion vector is relatively large.

By applying the accumulated error AE and the motion vector (MVx, MVy) supplied from the motion detection section 110 to Equations (2) and (3), the estimated value J about one-direction frame prediction can be calculated. However, MVx and MVy of the previous encoded block are stored as PMVx and PMVy of Equation (3), respectively, and then reset to zero before the estimated value is calculated for the leftmost block of the input picture data.

It should be noted that if encoding is sequentially carried out from the block at the upper left corner of a picture toward the block at the lower right corner thereof, then MVx and MVy of the previous encoded block refer to the motion vector (MVx and MVy) of the adjacent block on the left-hand side.

An example of one-direction frame prediction has been described. However, the estimated value may also be calculated in a similar manner in any other prediction mode.

That is why an estimated value J that should be close to a real value is supposed to be calculated. In this preferred embodiment, to figure out the estimated value J as accurately as possible, an estimated code size associated with the motion vector is calculated with the ways of selecting Kmv changed appropriately.

The coefficient updating section 214 updates the proportionality factor based on the accumulated error in the prediction mode that has been determined by the determining section 211, the generated code size that has been supplied from the variable-length encoding section 105 (i.e., the size of the encoded data), and the quantization scales that have been determined by the quantization section 104 for a block that was encoded in the past and for the current block to be encoded. For example, K1 of the Equation (2) described above is updated. The following Equation (5) shows how K1 may be updated:

$$K1 = (B\_ave * Q\_ave)/(AE\_ave * Qcur) \quad (5)$$

AE_ave, B_ave and Q_ave are respectively the averages of the accumulated errors AE, the generated code sizes B and the quantization scales Q used for the respective blocks of the input picture data that were encoded during a certain period. The prediction modes may be different from one block to another. Qcur is the quantization scale for use in the block to be encoded.

On receiving the quantization scale Qcur from the quantization section 104, the coefficient updating section 214 updates the proportionality factor K1. The updated proportionality factor K1 is sent to the estimating section 213, which estimates the code size using the new factor.

Next, it will be described how to estimate the code size using the proportionality factor K1.

FIG. 8 is a graph showing a correlation between the proportionality factor K1, the accumulated error AE and the estimated code size B, which is calculated as a product of K1 and AE (i.e., B=K1·AE) and corresponds to the first term of the right side of Equation (2).

According to the Equation (5) described above, the proportionality factor K1 can be regarded as a function of the quantization scale Qcur. In the following description, Qcur that gives the linear function B=K1·AE represented by the solid line in FIG. 8 is supposed to be used as a reference and will be referred to herein as "reference Qcur".

Also, according to Equation (5), if Qcur is set to be greater than the reference Qcur, K1 decreases, i.e., the gradient of the graph becomes gentler. Therefore, compared to the situation where the reference Qcur is used, the estimated code size B decreases with respect to the same accumulated error AE. As a result, the definition of the image decreases. On the other hand, if Qcur is set to be smaller than the reference Qcur, K1 increases, i.e., the gradient of the graph becomes steeper. Therefore, compared to the situation where the reference Qcur is used, the estimated code size B increases with respect to the same accumulated error AE. As a result, the definition of the image increases. In an actual quantization process, if the quantization scale Qcur is increased, the definition of the image also decreases. And if the quantization scale Qcur is decreased, then the definition of the image also increases. That is why the code size can be estimated accurately by using this coefficient.

Hereinafter, the procedure of the processing to be carried out by the encoder 210 will be described. FIG. 9 shows the procedure of the encoding process performed by the encoder 210. First, in Step S90, the estimating section 213 sets the value of the proportionality factor K1 to a predetermined value (of 1/16, for example). This measure is taken because K1 has not been calculated yet when the coding process is started.

Next, in Step S91, the encoder 210 receives the moving picture data and stores it in the input picture memory 101. Subsequently, in Step S92, the input picture memory 101 outputs a portion (e.g., a block) of the picture data after another.

Thereafter, in Step S93, the estimating section 213 calculates an estimated value J for each prediction mode using the proportionality factor K1. Then, in Step S94, the estimating section 213 compares the estimated values J that have been calculated for the respective prediction modes with each other, and selects a prediction mode that produces the smallest estimated value J as a prediction mode for motion compensation.

Next, in Step S95, the encoder 210 encodes the picture data of the target block by either inter-picture predictive coding or intra coding with no motion compensation in the prediction mode selected.

If the inter-picture predictive coding has been carried out in the previous processing step S95, the estimating section 213 accumulates, in the next processing step S96, AE, Q and B for the prediction mode that has been adopted for the motion compensation.

Subsequently, in Step S97, the estimating section 213 updates the proportionality factor K1 based on the respective averages AE_ave, Q_ave and B_ave of AE, Q and B that were accumulated during a certain period in the past and on the quantization scale Qcur of the next target block.

Then, in Step S98, the encoder 210 determines whether or not all blocks of that picture have been encoded yet. If not all blocks have been encoded yet, the process goes back to the processing step S92 and the same series of processing steps are carried out all over again. On the other hand, if the answer is YES, the process advances to Step S99, in which the encoder 210 determines whether or not the moving picture data has been encoded entirely yet. If the moving picture data has not been encoded entirely yet, the process goes back to the processing step S92 and the same series of processing steps are carried out all over again.

According to the flowchart shown in FIG. 9, the processing step S97 is carried out on a block-by-block basis. However, the updating processing step may also be performed on either one horizontal row of blocks after another or one frame after another. Also, according to the flowchart shown in FIG. 9, it is not until the series of block-by-block processing steps S92 through S97 have all been done that the processing on the next block is started. Optionally, these processing steps may be carried out in parallel with each other as a pipeline process (e.g., while the processing step S92 is being performed on the $N^{th}$ block, the processing steps S93 and S94 may be carried out on the $(N-1)^{th}$ and $(N-2)^{th}$ blocks, respectively).

Furthermore, in the preferred embodiment described above, the sum of the absolute values of differences between blocks is used as the accumulated error of the predicted error picture data. Alternatively, any other statistical quantity, including the sum of squares of predicted error picture data, the root of the sum of squares of predicted error picture data, and the variance or the standard deviation thereof, may also be used as long as the value has anything to do with the similarity of predicted error picture data.

Furthermore, in the preferred embodiment described above, either the motion vector of the adjacent block on the left-hand side of the block to be encoded or a motion vector with zero magnitude is used as the predicted vector. However, the predicted vector does not have to be determined by this method. Alternatively, the vector may also be determined by the average, median or mode of the motion vectors of more than one block that are adjacent to the block to be encoded.

Still alternatively, not the estimated code size but a code size obtained by actually performing variable-length coding (VLC) on the motion vector of the block to be encoded may be used as the estimated value of the motion vector component. Optionally, an estimated code size calculated by a simplified variable-length coding equation may also be used.

Embodiment 2

FIG. 10 shows a configuration for an encoder 300 according to a second preferred embodiment of the present invention. The encoder 300 may replace the encoder 210 of the first preferred embodiment described above as an integral part of the recorder 200 shown in FIG. 3.

Hereinafter, the encoder 300 will be described. Any component of the encoder 300, having the same function as the counterpart of the encoder 210 of the first preferred embodiment described above, is identified by the same reference numeral and the description thereof will be omitted herein.

The picture encoder 300 includes an input picture memory 101, a subtracting section 102, an orthogonal transformation section 103, a quantization section 104, a variable-length encoding section 105, an inverse quantization section 106, an inverse orthogonal transformation section 107, an adding section 108, a reference picture memory 109, a motion detection section 110, a prediction mode determining section 211, a motion compensation section 112, an estimating section 213 and a coefficient updating section 314.

The estimating section 313 calculates an estimated value for each prediction mode based on the accumulated error and motion vector of the prediction mode that have been supplied from the motion detection section 110 and on a proportionality factor and a correction coefficient that have been determined by the coefficient updating section 314. For example, an estimation function for calculating an estimated value J for one-direction frame prediction, which is one of the prediction modes according to the MPEG standards, may be given by the following Equation (6):

$$J = \text{Max}(K1*AE+K2, 0) + Kmv*\Delta MV \qquad (6)$$

The first term of the right side corresponds to an estimated value (i.e., estimated code size) about the predicted error picture data and the second term of the right side corresponds to an estimated value (i.e., estimated code size) about the motion vector. Also, in Equation (6), K1 is a proportionality factor, K2 is a correcting coefficient and Kmv and $\Delta MV$ are the same parameters as those used for the first preferred embodiment described above.

FIG. 11 is a graph showing how the first term of the right side of Equation (6) (i.e., the estimated code size for the predicted error data) changes. This graph is different from that of FIG. 8, showing the estimated code size in the first preferred embodiment, in that when the accumulated error AE exceeds the AE coordinate value at the point A, the estimated code size starts to increase.

More specifically, in the graph shown in FIG. 8, even if the accumulated error AE is small, the generated code size is still estimated to be more than zero. On the other hand, in the graph shown in FIG. 11, the code size is estimated to be zero in the range from the origin O to the point A. This is because while the accumulated error AE is small (i.e., if the AE value falls within the range from the origin O to the point A), every transform coefficient becomes equal to zero as a result of the quantization and the code size should remain zero. Alternatively, the zero value may be replaced with a value in the vicinity of zero.

According to this theory, calculations are made in the following procedure. The estimating section 313 determines whether or not the accumulated error of each prediction mode is smaller than the average of accumulated errors when all quantized transform coefficients become equal to zero for the block that was encoded in the past. If the answer is YES, the estimating section 313 calculates the estimated value on the supposition that Max(K1*AE+K2, 0) of Equation (6) is equal to zero, which is equivalent to supposing K1*AE+K2 to be equal to zero. In this example, the accumulated error of each prediction mode is compared to the average of accumulated errors about a block that was encoded in the past. Alternatively, the average may be replaced with a maximum value, for example.

It can be seen that according to this preferred embodiment, the estimated value is calculated in view of the actual quantization process. For that reason, by using K1 and K2 as in Equation (6), an estimated code size can be calculated even more accurately. In Equation (6), the accumulated error AE is multiplied by K1, K2 is added to the product, and then the lower limit is defined by a threshold value of zero in order to prevent the estimated code size from going negative.

The coefficient updating section 314 updates the proportionality factor and the correction coefficient. In updating these coefficients, the coefficient updating section 314 uses the accumulated error in the prediction mode that has been determined by the prediction mode determining section 211, the generated code size that has been supplied from the variable-length encoding section 105, and the quantization scales that have been determined by the quantization section 104 for a block that was encoded in the past and for the current block to be encoded.

The coefficient updating section 314 updates K1 and K2 included in the Equation (6) described above. For example, K1 and K2 may be updated by the following Equations (7) and (8), respectively:

$$K1 = (B\_ave * Q\_ave)/\{(AE2\_ave - AE1\_ave)*Qcur\} \quad (7)$$

$$K2 = (-1)*K1*AE1\_ave \quad (8)$$

AE1_ave is the average of the accumulated errors AE of the blocks, the transform coefficients of which have all become equal to zero as a result of the quantization, in the predicted error data in the prediction mode adopted for each block of the input picture data that was encoded during a certain period of time, and AE2_ave is the average of accumulated errors AE of the blocks, the transform coefficients of which remain not equal to zero even after the quantization. The point A in the graph shown in FIG. 6 corresponds to the coordinates (AE1_ave, 0). B_ave, Q_ave and Qcur are the same parameters as those used in the first preferred embodiment described above.

By considering an AE range in which the transform coefficient becomes equal to zero as a result of the quantization using Equations (6) through (8), the estimated code size can be calculated even more accurately.

The processing carried out by the encoder and the decoder described above is realized by getting a computer program executed by a general-purpose computer. Such a computer program may include instructions to carry out the processing that is defined by the flowchart shown in FIG. 9. The computer program may be stored in any of various types of storage media and circulated as a product on the market. Examples of preferred storage media include optical storage media such as optical disks, semiconductor storage media such as an SD memory card and an EEPROM, and magnetic recording media such as a flexible disk. Alternatively, the computer program may also be downloaded over a telecommunications network such as the Internet.

INDUSTRIAL APPLICABILITY

An encoder according to the present invention and a moving picture recording system including such an encoder can encode moving picture data highly efficiently. Particularly when motion compensated prediction is carried out during inter-picture predictive coding, the coefficients for use in calculating an estimated value to determine a prediction mode are learned and updated during the encoding process. As a result, an appropriate prediction mode can always be adopted and good image quality can be maintained consistently.

The invention claimed is:

1. An encoder for performing motion compensated inter-picture predictive coding on moving picture data including image data of multiple pictures, the encoder comprising:
    an accumulated error detecting section for detecting, for each of multiple prediction modes, an accumulated error between a block to be encoded, which is included in image data to be encoded, and a reference block of reference picture data to be used in each said prediction mode when the block to be encoded is encoded;
    a transformation section for transforming the accumulated error in each said prediction mode, which has been detected by the accumulated error detecting section, into an estimated code size in the prediction mode using transformation data;
    a determining section for selecting one of the multiple prediction modes according to an estimated value based on the estimated code size in each said prediction mode that has been transformed by the transformation section; and
    an encoding section for encoding the block to be encoded of the image data to be encoded in the prediction mode selected,
    wherein the transformation data is determined by a quantization scale for use when the block to be encoded is quantized and another quantization scale that has been used at a different time from the former quantization scale, and
    further comprising
    a motion vector detecting section for detecting, for each of multiple prediction modes, a motion vector between a block to be encoded, which is included in image data to be encoded, and a reference block of reference picture data to be used in each said prediction mode when the block to be encoded is encoded; and
    an estimating section for calculating an estimated value for each said prediction mode based on the estimated code size that has been transformed by the transformation section for each said prediction mode and on the motion vector that has been detected by the motion vector detecting section for each said prediction mode,
    wherein the determining section selects one of the multiple prediction modes according to the estimated value that has been calculated by the estimating section for each said prediction mode.

* * * * *